United States Patent [19]
Wang

[11] Patent Number: 5,918,184
[45] Date of Patent: Jun. 29, 1999

[54] METHOD AND APPARATUS FOR DETECTING A SUPERVISORY AUDIO TONE

[75] Inventor: Robert Chuenlin Wang, Mendham Township, Morris County, N.J.

[73] Assignee: Lucent Technologies Inc., Murray Hill, N.J.

[21] Appl. No.: 08/246,387

[22] Filed: May 20, 1994

Related U.S. Application Data

[63] Continuation-in-part of application No. 08/165,568, Dec. 13, 1993, abandoned, which is a continuation of application No. 07/947,695, Sep. 21, 1992, abandoned.

[51] Int. Cl.$^6$ .................................................. H04Q 7/30
[52] U.S. Cl. ........................ 455/561; 455/436; 455/562; 370/330; 370/332
[58] Field of Search ................................ 379/58, 59, 60; 455/436, 561, 562; 370/330, 332

[56] References Cited

U.S. PATENT DOCUMENTS

| | | | |
|---|---|---|---|
| 4,513,412 | 4/1985 | Cox | 370/29 |
| 4,670,899 | 6/1987 | Brody et al. | 370/60 |
| 4,675,863 | 6/1987 | Paneth et al. | 370/50 |
| 4,704,734 | 11/1987 | Menich et al. | 455/33.1 |
| 5,001,742 | 3/1991 | Wang | 379/60 |
| 5,239,675 | 8/1993 | Dudczak | 455/33.2 |
| 5,285,447 | 2/1994 | Hulsebosch | 370/69.1 |
| 5,289,464 | 2/1994 | Wang | 370/69.1 |

FOREIGN PATENT DOCUMENTS

| 9014730 | 11/1990 | WIPO | 379/60 |
|---|---|---|---|

OTHER PUBLICATIONS

Taub, et al "Principles of Communication Systems" 1986 Chapter 14: Communication System and Noise Calculations.
Levine, et al "Narrowband FM Cellular Systems" 40th IEEE Vehicular Technology Conference, May 6–9, 1990.
Smith, Jr. "Passive Location of Mobile Cellular Telephone Terminals", 25th Annual 1991 IEEE International Carnahan Conference Oct. 1991.
J. Decaluwe, J. M. Rabaey, J. L. Van Meerbergen, and J. J. De Man, "Interprocessor Communication in Synchronous Multiprocessor Digital Signal Processing Chips," *IEEE Transactions on Acoustics, Speech, and Signal Processing*, vol. 37, No. 12, Dec. 1989, pp. 1816–1828.
J. G. Proakis and D. G. Manolakis, *Introduction to Digital Signal Processing*, Macmillan, New York 1988, pp. 395–400 and 795–848.
*IEEE Standard Dictionary of Electrical and Electronics Terms*, 1984, p. 82.
R. E. Crochiere and L. E. Rabiner, *Multirate Digital Signal Processing*, Prentice–Hall, 1983, Ch. 7, pp. 289–310.
G. A. Arrendo, J. C. Feggeler, and J. I. Smith, *The Bell System Technical Journal*, vol. 58, pp. 97–143 (1979).
N. Ehrlich, R. E. Fisher and T. K. Wingard, *The Bell System Technical Journal*, vol. 58, pp. 153–199 (1979).
W. C. Jakes, *Microwave Mobile Communications*, Wiley, New York, 1974, pp. 172–173.
Macario, "Cellular Radio Principles and Design" 1993 pp. 18–22.

*Primary Examiner*—William Cumming
*Attorney, Agent, or Firm*—Robert B. Levy

[57] ABSTRACT

The presence of a supervisory audio tone signal (SAT), superimposed on a voice/data signal transmitted in a cellular telephone system, is carried out by first deleting the voice/data signal, leaving only the SAT signal. Thereafter, the SAT signal power and noise power are determined. During intervals when the SAT signal rises and falls, the SAT noise power and signal power move in opposite directions when the radio carrier turns on and off, respectively. By comparing the SAT noise power to the SAT signal power, a fast, accurate determination can be made as to whether the SAT signal is present. Moreover, the ratio of the SAT signal power to SAT noise power provides a good estimate of the quality of the channel in the cellular telephone system. By repeatedly computing the SAT signal power to noise power ratio, a base station (48) in the cellular telephone system can decide when to hand off, and to which other base station such hand-off should be made.

12 Claims, 3 Drawing Sheets

SAT DETECTION RISE TIME

SAT DETECTION FALL TIME

FIG. 4
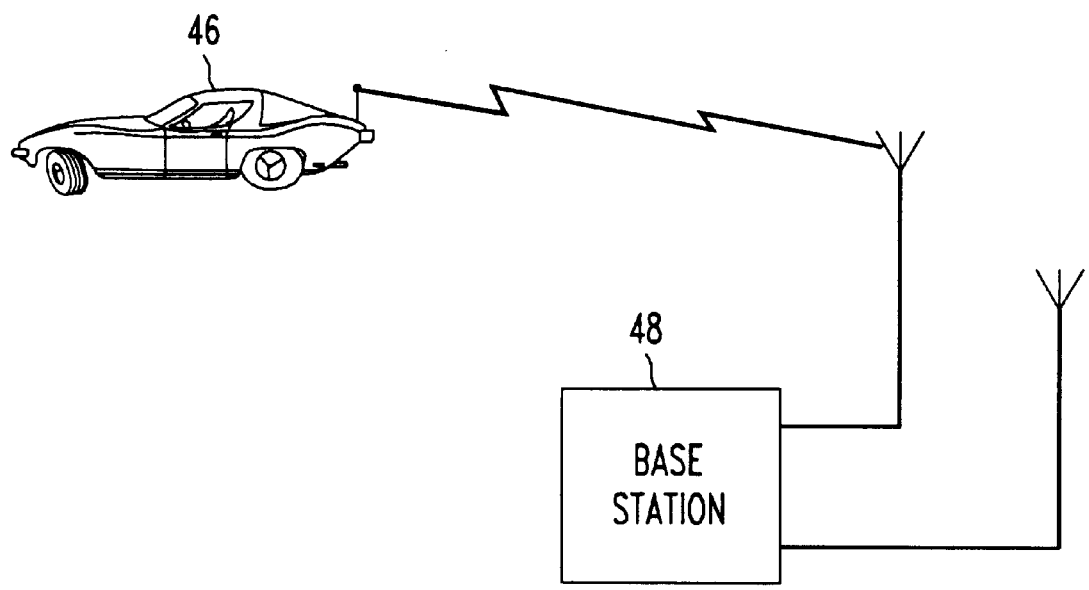
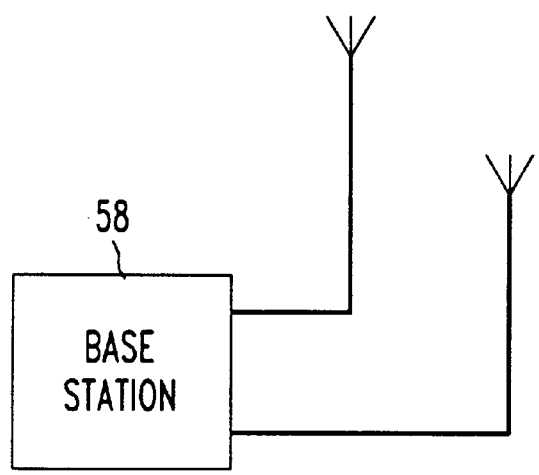

METHOD AND APPARATUS FOR DETECTING A SUPERVISORY AUDIO TONE

This application is a continuation-in-part of application Ser. No. 08/165,568, filed on Dec. 13, 1993 now abandoned, which is a continuation of application Ser. No. 07/947,695, filed on Sep. 21, 1992 now abandoned.

TECHNICAL FIELD

This invention describes a technique for detecting the presence of a supervisory audio tone superimposed on a voice/data signal.

BACKGROUND OF THE INVENTION

Cellular telephony is based on the concept of dividing a geographical area into a plurality of individual sub-areas or "cells." Situated within each cell is a base station containing at least one receiver and transmitter pair (i.e., a radio channel unit) tuned to a particular frequency (channel) for communicating with a mobile terminal, also tuned to receive and transmit on that channel. Typically, the mobile terminal is carried in a vehicle in transit within that cell. As the vehicle containing the mobile terminal travels from one cell into another, the call between the mobile terminal and the cell site base station is "handed-off" (i.e., transferred) to the base station of the new cell.

In order to determine whether the mobile terminal remains in communication with the base station, or if not, whether to hand-off the call from one base station to another, the cell site transmits a Supervisory Audio Tone (SAT) signal superimposed on its voice/data signal and the mobile terminal transponds the SAT signal back to the cell site. For so long as the base station receives the SAT signal, the base station knows that it is in communication with the mobile terminal. As described in my previous U.S. Pat. No. 5,001, 742, issued Mar. 9, 1991, and assigned to AT&T Bell Laboratories, the instant assignee, the SAT signal presence is currently detected by monitoring the power of the signal. When the power of the SAT signal exceeds a predetermined threshold, the SAT signal is deemed to be present. Conversely, if the power of the SAT signal is below the threshold, the SAT signal is deemed to be absent.

While this method is effective for detecting the presence of the signal, in practice, the time required to detect the SAT signal in this manner has been found to be excessive. In order to reliably detect the presence of an SAT signal by monitoring its power, the signal power measurement must be reliable and stable. As a consequence, some processing delay is invariably involved. The delay incurred in detecting the presence of an SAT signal tends to cause long mute times during call hand-offs, which is disadvantageous. When a call is to be handed off between base stations, the mobile-to-land portion of the call is muted briefly to eliminate undesirable, unquiet receiver noise when the mobile terminal switches channels.

At the base station, the radio channel unit commences the muting when the mobile terminal confirms the hand-off order on the old channel. The radio channel unit at the new base station unmutes the voice signal when it confirms the presence of the SAT signal from the mobile terminal on the new channel. The length of the muting interval is determined by the time required to detect the presence of the SAT signal.

The length of time spent in detecting the absence of an SAT signal, such as when a mobile terminal abnormally terminates a call, is also disadvantageous, as it may lead to excessive noise. When a mobile terminal abnormally terminates a call, the land-based party will hear unquiet receiver noise before the base station senses the absence of the SAT signal and terminates the call. The longer the time required to detect the absence of the SAT signal, the longer the duration of the noise.

Thus, there is a need for a technique for more rapidly detecting the presence and absence of an SAT signal.

SUMMARY OF THE INVENTION

Briefly, in accordance with the invention, a technique is disclosed for detecting the presence or absence of a supervisory audio tone superimposed on a voice/data signal. The technique is practiced by first separating the SAT signal from the voice/data signal on which the SAT signal is superimposed. Thereafter, both the signal power and noise power of the SAT signal are determined. The SAT signal noise power and signal power move in opposite directions when the SAT signal rises and falls, respectively, owing to the FM capture phenomenon, whereby an FM receiver will suppress the noise and capture the signal modulation when the signal modulation exceeds the noise, and will capture the noise and suppress the signal modulation when the noise exceeds the signal modulation. Therefore, the point at which the representative plots of SAT noise power and signal power intersect (cross-over) becomes a good point at which the SAT signal can be detected. By detecting whether the SAT signal power exceeds the noise power, the presence of an SAT signal can be detected more rapidly because the oppositely moving curves associated with SAT noise and signal power cross each other at an earlier point in time than when each moving curve crosses a fixed threshold.

The above-described scheme for detecting the presence of the SAT signal may also be employed as an indicator of the quality of the channel for purpose of effecting channel hand-off. The ratio of the SAT signal power to the SAT noise power provides a good measure of how much impurity is present in the SAT signal received at a cell base station as a consequence of radio noise and interference. Obviously, a channel that has a high degree of radio noise and interference is not a channel that will support high quality radio transmission. By monitoring the SAT signal power to noise power ratio, a cell site base station in communication with a mobile terminal can determine the quality of the channel presently being used by the cell base station and the mobile terminal. Should the SAT signal power to SAT noise power ratio, as measured at a particular base station, drop below a prescribed threshold, then a locate request is initiated so that at least one, and preferably a plurality of neighboring cell sites, each measure the SAT signal power to noise power ratio. The call is then handed off to the cell base station measuring the highest SAT signal power to noise power ratio. For mobile-assisted hand-off, the mobile terminal could measure the SAT signal power to noise power ratio and report this information to the cell site base station to assist the base station in making the hand-off decision for the mobile-to-base direction.

BRIEF DESCRIPTION OF THE DRAWING

FIG. 4 shows the transfer of a call between a mobile terminal and one base station and another base station.

DETAILED DESCRIPTION

Figure 1:
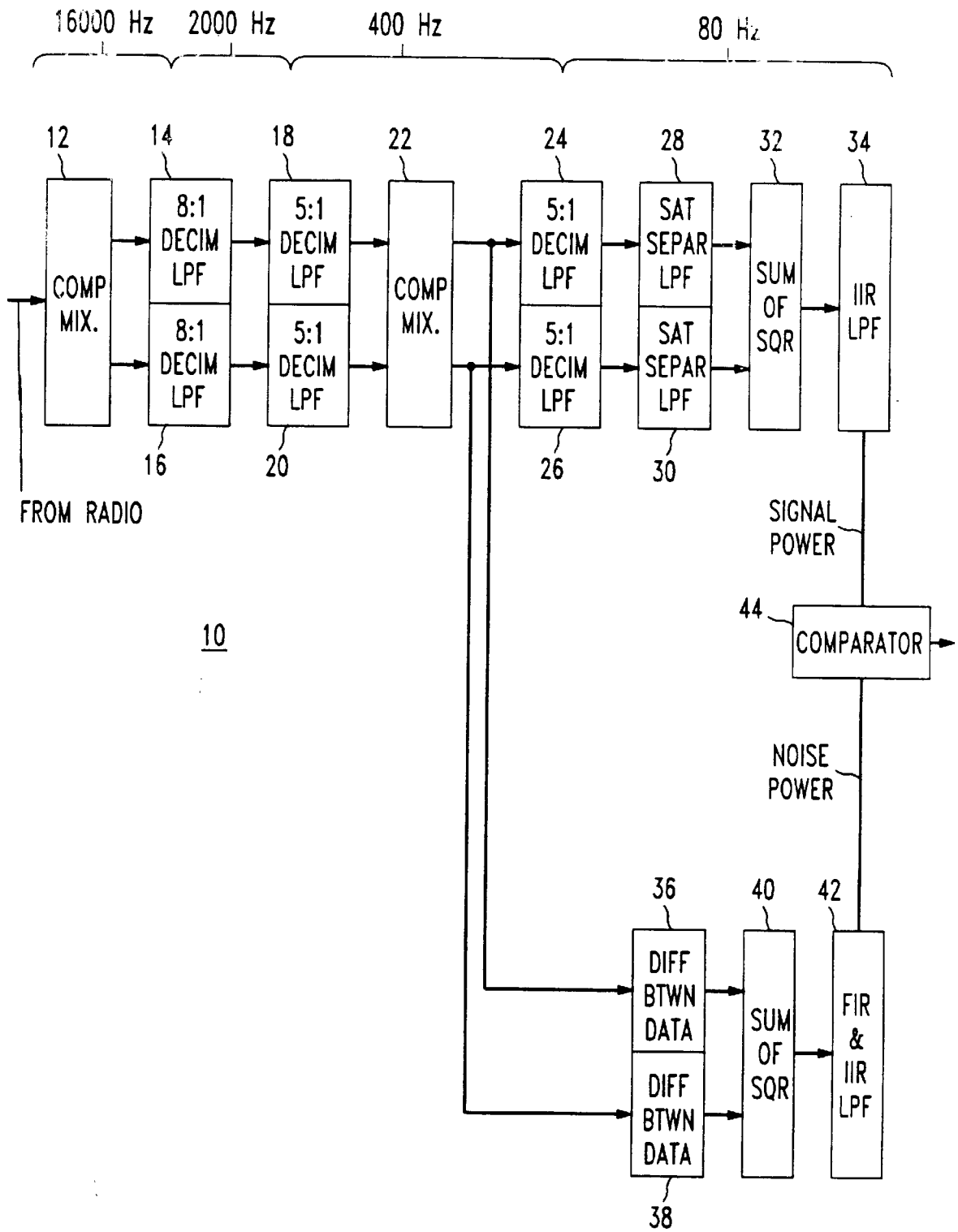
FIG. 1 is a symbolic block schematic diagram of a circuit in accordance with the invention for detecting the noise power and signal power of an SAT signal.

FIG. 1 is a symbolic block schematic diagram of a circuit 10, in accordance with the invention, for detecting the presence of a Supervisory Audio Tone (SAT) signal superimposed on a voice/data signal transmitted by a mobile cellular telephone terminal (not shown). For ease of description, the circuit 10 of FIG. 1 is depicted as a plurality of discrete elements, each performing a specific function as described below. In actuality, the circuit 10 is typically comprised of a single digital signal processor, such as an AT&T DSP 16 digital signal processor, which is programmed to carry out the functions separately performed by each element shown in FIG. 1.

The circuit 10 comprises a complex mixer 12, in the form of a multiplier, which is supplied from a CODEC (not shown) with periodic samples of a received voice/data signal on which the SAT signal is superimposed. In practice, the CODEC samples the received voice/data signal at a rate of 16,000 Hz, although other sampling rates are possible. The mixer 12 operates by multiplying the voice/data signal sample by the terms $\cos(2\pi f_1 n_1/f_{s1}) + j \sin(2\pi f_1 n_1/f_{s1})$ where $f_1$ is set to be −6000 Hz and $f_{s1}$=16,000 Hz. By performing these multiplications, the complex mixer 12 effectively shifts the incoming sample to a DC value or 30 Hz away from DC depending on the SAT frequency. This value is referred to as an approximate DC value.

Note that the value off $f_1$ in the multiplication terms will differ for SAT signals at a different frequency. By the same token, the denominator of each of the multiplication terms will also differ for a different CODEC sampling rate, Typically, the multiplications are performed using a look-up table. Because of the repetitive nature of the 16,000 Hz cycle numbers, only eight separate numbers are required to perform the necessary multiplications.

The complex mixer 12 generates real and imaginary output signals which are each subjected to an 8:1 decimation by a separate one of a pair of decimators 14 and 16, respectively. The output signal of each of the decimators 14 and 16 is subjected to a 5:1 decimation by a separate one of a pair of decimators 18 and 20, respectively. The effect of the 8:1 and 5:1 decimations on the complex mixer 12 output signals is to low-pass filter such signals and thereby effectively reducing the sampling rate and removing the voice/data portion of the sampled signal, leaving only the SAT signal portion.

The output signal of each of the decimators 18 and 20 is input to a second complex mixer 22 which multiples each decimator output signal by a separate one of the terms $\cos(2\pi f_2/f_{s2}) + j \sin(2\pi f_2 n_2/f_{s2})$ where $f_2$=30,0 or −30 depending on whether the incoming SAT signal is expected to be at a frequency of 5970, 6000 or 6030 Hz, $f_{s2}$=400 Hz and $n_2$ is a separate one of a set of 400 Hz cycle numbers. Note that the complex mixing functions performed by the mixers 12 and 22 could be performed by a single mixer, but it is useful to perform these functions separately, when implementing the circuit 10 using a digital signal processor, in order to reduce the required table size. If the input signal to the second mixer 22 is a constant tone at the correct frequency (i.e., the SAT signal is at the expected frequency and has been successfully stripped from the voice/data signal), then the complex mixer 22 outputs a pair of constants.

The real and imaginary output signals generated by the complex mixer 22 are supplied to a separate one of a pair of 5:1 decimators 24 and 26 which serve to decimate the real and imaginary complex mixer output signals, respectively, from the complex mixer so as to effectively average their value. Each of a pair of low-pass filters 28 and 30 low-pass filters a separate one of the decimator 24 and 26 output signals. A summing block 32 first calculates the square of the output signal of a separate one of the decimators 28 and 30 and then sums the squared signal values. The output of the summing block 32 is filtered by an infinite-impulse-response, low-pass filter 34 which yields an output signal indicative of the SAT signal power.

To obtain an indication of the SAT signal noise power, the output signals of the complex mixer 22 are input to a separate one of a pair of difference blocks 36 and 38 which each serve to establish the difference between successive ones of the complex mixer 22 real and imaginary output signals, respectively, to obtain a measure of the noise level.

The difference computation function performed by the blocks 36 and 38 needs to be performed at a sufficiently high sampling rate to capture wide-band noise without incurring sizable delays in signal processing. While a very high sampling rate could be obtained by supplying the blocks 36 and 38 with the output signal from the mixer 12, the processing time would be high. For this reason, the difference blocks are supplied with signals from the mixer 22.

The output signal of each of the difference blocks 36 and 38 is input to a summing block 40, which, like the summing block 32, serves to determine the square of each of the input signals supplied thereto, and then compute the sum of the squared signal values. The output signal of the summing block 40 is input to a finite-impulse-response and infinite-impulse-response, low-pass filter 42 which yields an output signal indicative of the SAT signal noise.

When attempting to compare the noise power to the signal power, it is useful to "smooth" each of these quantities, hence the use of the filters 34 and 42. In filtering the noise power, it is especially useful to configure the filter 42 as a combined Finite Impulse Response (FIR) and Infinite Impulse Response (IIR) filter. During the interval that the noise power is greater than the signal power, the output of the filter 42 should fluctuate directly with the noise power. Thus, during this interval, the filter 42 acts as an FIR filter as opposed to an IIR filter because the FIR filter affords the advantage of greater linearity as compared to IIR filters.

Once the signal power exceeds the noise power (i.e., the output of the FIR<signal power), it is then desirable for the filter 42 to act as an IIR filter, as such filters offer sharper cutoff than FIR filters. To this end, when the signal power exceeds the noise power, the filter 42 becomes an IIR filter whose state variable corresponds to the previous FIR output signal.

The output signals of the filters 34 and 42, representing the SAT signal power and noise power, respectively, are input to a comparator 44 which compares the SAT signal power to the SAT signal noise to determine whether the SAT signal is present.

Figure 2:
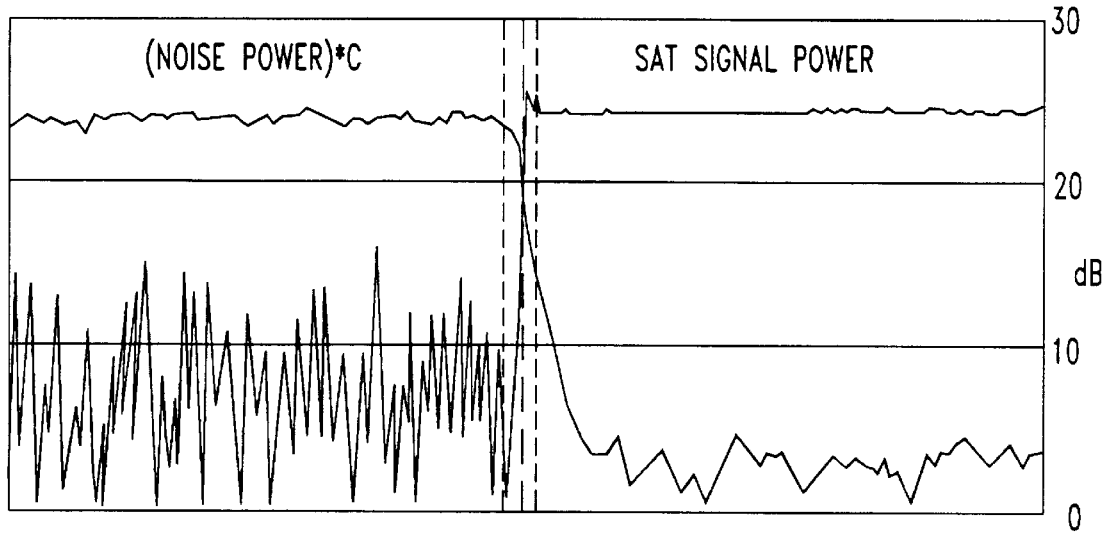
FIG. 2 is a graphical representation of the magnitude of SAT noise power and SAT signal power versus time as the SAT signal power rises.
Figure 3:
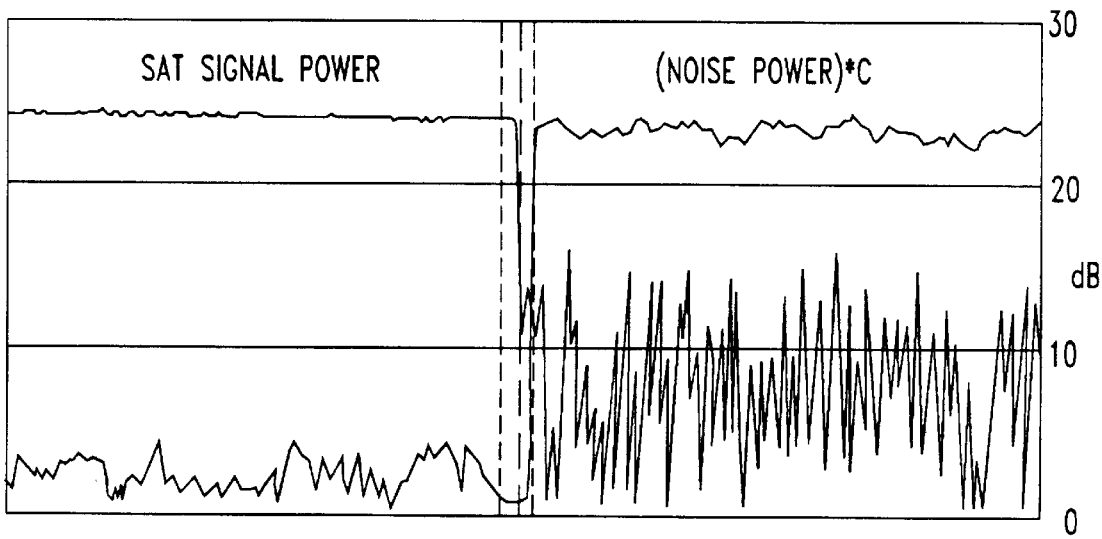
FIG. 3 is a graphical representation of the magnitude of SAT noise power and SAT signal power versus time as the SAT signal power falls.

To appreciate how the above-described circuit 10 yields a more rapid determination of the SAT signal presence than the prior-art technique of comparing the SAT signal power to a fixed threshold, reference should be had to FIGS. 2 and 3. FIG. 2 shows a plot of the SAT signal power and SAT signal noise versus time during the interval in which the SAT signal power rises. During this interval, the SAT signal power and SAT signal noise move in opposite directions, crossing over after approximately 80 milliseconds. The SAT signal power curve crosses a fixed constant, representing a minimum SAT power threshold previously used for SAT signal detection, after approximately 100 milliseconds. As may be appreciated form FIG. 2, the SAT signal power curve crosses the SAT signal noise power curve at an earlier interval than when the SAT signal power curve reached a fixed threshold. Thus, comparing the SAT signal power to the SAT noise power allows for more rapid SAT detection.

FIG. 3 shows the SAT signal power and SAT noise power curves during the interval when the SAT signal falls off. As in the case of FIG. 2, the SAT signal power curve crosses the SAT signal noise curve after approximately 120 milliseconds. In contrast, the SAT signal power curve does not drop below a fixed constant, representing the minimum threshold for SAT detection, until after approximately 650 milliseconds. Thus, the SAT detection fall time is reduced by using the cross over point of the SAT signal power and SAT noise power curves in accordance with the technique of the invention, in contrast to comparing the SAT signal power to a fixed threshold value.

The above-described scheme for detecting the presence of the SAT signal can also be used to advantageously effect channel hand-off in a cellular telephone system. Referring to FIG. 4, currently the decision to effect hand-off of a call from a mobile terminal 46 and one cell base station 48, then in communication with a mobile terminal, to another base station 50, is made in accordance with the strength of the received signal from the mobile terminal, as represented by a Received Signal Strength Indicator (RSSI). Effecting call hand-off on the basis of the RSSI is effective in cellular systems where the noise is limited. In systems where the noise is not limited, the RSSI can be distorted by such noise and by interference from adjacent-channel or co-channel radio signals.

In accordance with another aspect of the invention, the SAT signal to SAT noise ratio can be used as a measure of the channel quality in order to determine whether a call should be handed off between the base stations 48 and 50. Since the SAT signal is superimposed on the voice/data signal, the quality of the SAT signal is indicative of the quality of the voice/data signal. Moreover, since the SAT signal has a constant level, the SAT signal power is likewise constant. While the SAT signal power does not provide an indication of distortion, the SAT noise power does. Therefore, the ratio of the SAT signal power to SAT noise power ratio provides a good measure of the impurity present in the SAT signal, and hence the impurity present in the voice/data signal, due to radio noise and interference. Typically, during a call the SAT signal power remains constant, but the noise power fluctuates while mobile moves. Thus, most of the channel quality information is carried by the noise power measurement.

To effect a channel hand-off, in accordance with the SAT signal power to SAT noise power ratio, the base station 48 continuously computes this ratio in the manner described above with respect to FIGS. 1–3. If the base station 48 determines that the SAT signal power to SAT noise power ratio is below a prescribed threshold established in accordance with a minimal level of channel quality, then a locate request is initiated, causing each neighboring base station (e.g., base station 50) to determine the SAT signal power to SAT noise power ratio. The call from the mobile terminal 46 is then handed off to the base station that measures the highest SAT signal power to SAT noise power ratio.

The foregoing describes a technique for detecting the presence of an SAT signal superimposed on a voice/data signal by first determining the SAT signal power and noise power, and then comparing these quantities to detect the presence of the SAT signal.

It is to be understood that the above-described embodiments are merely illustrative of the principles of the invention. Various modifications and changes may be made thereto by those skilled in the art which will embody the principles of the invention and fall within the spirit and scope thereof.

I claim:

1. A method for detecting the presence of a Supervisory Audio Tone (SAT) when the SAT is superimposed on a Frequency-Modulated (FM) voice/data signal to ye a combined signal which is periodically sampled, comprising the steps of:

(a) receiving successive samples of the combined voice/data and SAT signal such that noise associated with said combined signal is suppressed and the combined signal is captured when the signal power of the combined signal exceeds the power of the noise and the combined signal is suppressed and the noise is captured when the power of the noise exceeds the power of the combined signal;

(b) deleting the voice/data signal from a sample containing the combined voice/data and SAT signal so that only the SAT remains:

(c) determining the dynamic signal power of the SAT;

(d) determining the dynamic noise power of the SAT, the SAT noise power moving in an opposite direction from the SAT signal power; and (e) comparing the signal power to the noise power of the SAT to determine if the signal power of the SAT exceeds the noise power of the SAT as occurs when the SAT is present.

2. The method according to claim 1 wherein the voice/data signal is deleted from the combined voice/data signal and SAT signal sample by the steps of:

(a) shifting the combined voice/data signal and SAT signal sample to an approximate DC value;

(b) low-pass filtering the approximate DC value; and (c) shifting the approximate DC value to a prescribed frequency depending on the SAT signal.

3. The method according to claim 2 wherein the step of shifting the combined voice/data signal and SAT signal sample to an approximate DC value comprises the step of performing a complex mixing operation thereon.

4. The method according to claim 2 wherein the step of frequency-shifting the approximate DC value comprises the step of performing a complex mixing operation on the approximate DC value.

5. The method according to claim 2 wherein the low-pass filtering step is performed by performing at least one decimation operation on the approximate DC value.

6. The method according to claim 5 wherein the low-pass filtering step is carried out by performing a pair of successive decimations.

7. A method for detecting the presence of a Supervisory Audio Tone (SAT) when the SAT is superimposed on a Frequency-Modulated (FM) voice/data signal to yield a combined signal which is periodically sampled, the FM voice/data signal, when received, having its noise suppressed when the voice/data has a signal power greater than that of the noise and the voice/data signal being suppressed when the signal power is less than that of the noise, comprising the steps of:

(a) deleting the voice/data signal from a sample containing the combined voice/data and SAT signal so that only the SAT remains, the deleting step including the sub-steps of:

(1) shifting the combined voice/data signal and SAT signal sample to an approximate DC value;
(2) low-pass filtering the approximate DC value; and
(3) shifting the approximate DC value to a prescribed frequency depending on the SAT;

(b) determining the signal power of the SAT wherein the step of determining the SAT signal power includes the sub-steps of:
(1) low-pass filtering the frequency-shifted, approximate DC value; and
(2) squaring the low-pass-filtered, frequency-shifted, approximate DC value; and
(3) subjecting the square of the low-passed-filtered, frequency-shifted DC value to a low-pass filtering operation by an infinite-impulse-response low-pass filter;

(c) determining the noise power of the SAT, the SAT noise power moving in an opposite direction from the SAT signal power; and (d) comparing the signal power to the noise power of the SAT to determine if the signal power of the SAT exceeds the noise power of the SAT as occurs when the SAT is present in the combined signal.

8. The method according to claim 7 wherein the step of determining the SAT noise power comprises the steps of:
detecting the difference between first and second frequency-shifted, approximate DC values associated with first and second successive samples of the voice/data signal and SAT signal, respectively;
determining the square of the difference between the first and second frequency-shifted approximate DC values; and
subjecting the square of the difference between the first and second frequency-shifted approximate DC values to a finite-impulse-response and infinite-impulse-response low-pass filtering operation.

9. A system for detecting the presence of a Supervisory Audio Tone (SAT), when superimposed on a voice/data signal, to yield a combined signal which is periodically sampled, comprising:
(a) means for deleting the voice/data signal from a sample of the combined voice/data and SAT signal so that only the SAT remains;
(b) means for determining the signal power of the remaining SAT;
(c) means for determining the noise power of the remaining SAT; and
(d) means for comparing the SAT signal power to the SAT noise power to determine if the signal power of the SAT exceeds the noise power of the SAT as occurs when the SAT is present in the combined signal.

10. The apparatus according to claim 9 wherein the means for deleting the voice/data signal from the combined voice/data signal and SAT signal sample comprises:
a first complex mixer for performing a first complex mixing operation on the combined voice/data signal and SAT sample to shift the sample to an approximate DC value;
decimating means for low-pass filtering the approximate DC value produced by the complex mixer; and
a second complex mixer for performing a second complex mixing operation on the low-pass-filtered, approximate DC value to shift the frequency thereof in accordance with the frequency of the incoming SAT signal.

11. A system for detecting the presence of a Supervisory Audio Tone (SAT) when superimposed on a voice/data signal to yield a combined voice/data and SAT signal which is periodically sampled, comprising:
(a) means for deleting the voice/data signal from a sample of the combined voice/data and SAT signal so that only the SAT remains, said means including
(1) a first complex mixer for performing a first complex mixing operation on the combined voice/data and SAT signal sample to shift the sample to an approximate DC value;
(2) decimating means for low-pass filtering the approximate DC value produced by the first complex mixer;
(3) second complex mixer for performing a second complex mixing operation on the low-pass-filtered, approximate DC value to shift the frequency thereof in accordance with the frequency of the incoming SAT;

(b) means for determining the signal power of the remaining SAT, said means including:
(1) low-pass filtering means for low-pass filtering the frequency-shifted, approximate DC value;
(2) means for determining the square of the low-pass-filtered, frequency shifted, approximate DC value; and
(3) an infinite-impulse response filter for filtering the square of the lowpass-filtered, frequency-shifted, approximate DC value;

(c) means for determining the noise power of the remaining SAT; and (d) means for comparing the SAT signal power to the SAT noise power to determine if the signal power of the SAT exceeds the noise power of the SAT as occurs when the SAT is present in the combined signal.

12. The apparatus according to claim 10 wherein the means for determining the SAT noise power comprises:
means for determining the difference between the first and second frequency-shifted, approximate DC values associated with first and second successive samples of the combined voice/data signal and SAT signal, respectively;
means for determining the square of the difference between the first and second frequency-shifted, approximate DC values associated with successive combined voice/data signal and SAT signal samples; and
an infinite-impulse and finite-impulse response filter for filtering the square of the difference between the low-pass- filtered, frequency-shifted, approximate DC values associated with successive combined voice/data signal and SAT signal samples.

* * * * *